Dec. 8, 1936. J. H. CROWE Re. 20,197

AUTOMOBILE CHASSIS FRAME AND METHOD OF MAKING SAME

Original Filed Sept. 19, 1931

INVENTOR
JAMES H. CROWE
BY
Louis W. Helmuth
ATTORNEY

Reissued Dec. 8, 1936

Re. 20,197

UNITED STATES PATENT OFFICE 20,197

AUTOMOBILE CHASSIS FRAME AND METHOD OF MAKING SAME

James H. Crowe, Cleveland, Ohio, assignor to The Midland Steel Products Company, Cleveland, Ohio, a corporation of Ohio Original No. 1,945,505, dated January 30, 1934, Serial No. 563,773, September 19, 1931. Application for reissue September 24, 1934, Serial No. 745,337

19 Claims. (Cl. 29—152)

This invention relates to new and useful improvements in automobile chassis frames.

An important object of the invention is to provide a chassis frame of requisite strength and elastic limit having a portion thereof capable of having a body finish and polish imparted thereto by the usual methods employed for imparting finish and polish to the metal body plates constituting the shell of an automobile body, whereby these portions of the chassis frame can be exposed to view as part of the exterior body appearance to take the place of adjuncts of the body such as the dust shields above the running boards; thus eliminating the usual expense of such separate parts.

Another important object is to provide a chassis frame having side rails provided with kick-ups or offsets at the ends thereof and which can be manufactured without the usual waste of material represented in scrap or the necessity of edgewise bending to produce the kicked-up portions.

Another object of the invention is to provide a side rail including a section to which may be imparted the requisite finish or polish equivalent to that of body plates by usual finishing methods.

A still further object of the invention is to provide a method of making a sectional chassis side rail from a plurality of separate blanks of any desired shape from stock material.

A further object of the invention is to produce a chassis frame which will possess in addition to the foregoing characteristics, an elastic limit of at least 40,000 pounds per square inch as economically as possible, using for the major part thereof, mild carbon steel of the formula S. A. E. 1025 and a lower carbon steel for certain sections thereof.

Other objects and advantages of the invention will become apparent during the course of the following description.

In the accompanying drawing forming a part of the descriptive matter and wherein like numerals are employed to designate like parts throughout the several views.

Heretofore it has been the general practice to form each side rail of an automobile chassis frame from a single blank of sheet steel integral throughout its entire length. When such frames are to possess a double drop or kick-up, portions of which are to be disposed above the front and rear axles of the vehicle for the purpose of lowering the center of gravity of the vehicle, it is necessary to either cut the single blank forming the side rail to the requisite shape resulting in severe waste by reason of the scrap incident thereto; by bending tubular stock; or by the process known as edgewise bending of the straight flat blank prior to its formation into the customary channel cross section. This latter procedure of edgewise bending is unsuitable for the purposes of this invention inasmuch as it results in some instances, in producing ripples or waves in the regions where the laterally offset portions to produce the kick-ups merge into the intermediate portion of the side rail, and moreover, subjects the blanks to two series of stresses acting substantially at right angles to each other, the first resulting from the edgewise bending and the second stresses resulting from the formation of the flat blank into appropriate cross section resulting frequently in the rupture or cracking of the side rails and a material weakening of the same at the points of greatest stress. As indicated previously, such edgewise bending would be unsuited for the purposes of this invention inasmuch as it would be apt to produce ripples or cracks in the intermediate portion of the side rail which it is proposed to employ under this invention as an exteriorly exposed part possessing the usual body finish. Obviously the first method mentioned of blanking the strip to shape is unsuitable as it is not economical and results in a substantial waste by reason of the resulting scrap.

Figure 1:
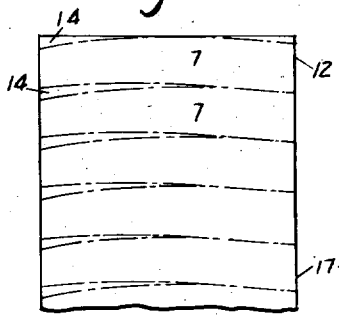
Fig. 1 is a plan of a stock size width of steel strip as it comes from the mill, the dotted lines indicating the manner of blanking out suitably shaped blanks used in the formation of the front portions of side rails.
Figure 3:
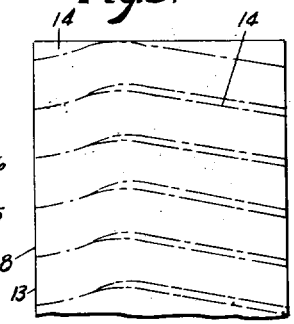
Fig. 3 is a similar view of a strip of steel as it comes from the mill, the dotted lines indicating the manner of blanking out the sections forming the rear ends of the side rails with the minimum amount of scrap.
Figure 4:
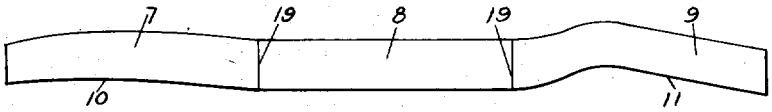
Fig. 4 is a plan of a flat blank composed of a blanked out section from each of the three preceding figures, the meeting end edges of the three blanks being integrally united preferably by butt-welding.
Figure 5:
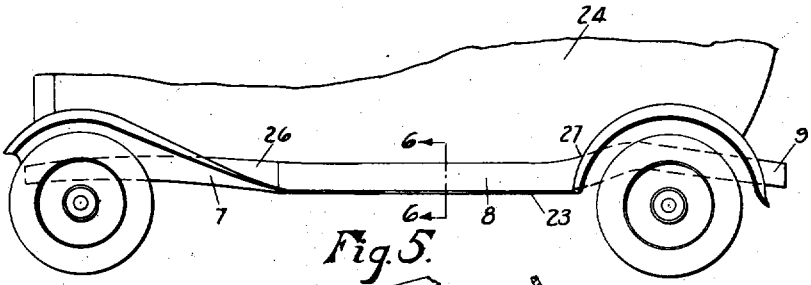
Fig. 5 is a side elevation of a portion of an automobile showing the improved chassis frame construction forming a part thereof.
Figure 7:
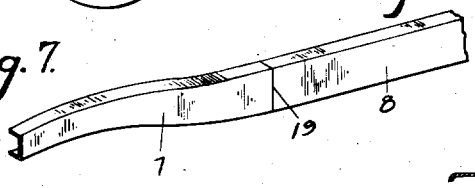
Fig. 7 is a perspective view of a portion of a channel shaped rail made in accordance with this invention.
Figure 6:
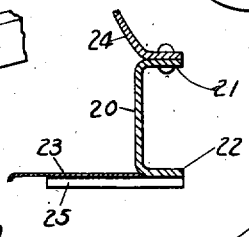
Fig. 6 is an enlarged transverse section of the same taken on the line 6—6 of Fig. 5.

In order to reduce the cost of manufacture of these chassis frames, facilitate the handling thereof during manufacture, reduce the expense of manufacturing equipment and to utilize portions thereof as component exteriorly exposed parts of the usual automobile body, such as the dust shields or aprons disposed above the running boards, each side rail is composed of component parts or sections butt-welded or secured in any other suitable manner to form an integral whole. Such a blank, prior to formation into a channel section is illustrated in Fig. 4 as composed of a front section or blank 7, an intermediate blank 8 and a rear blank or section 9. The front and rear blanks 7 and 9 are blanked to shape to provide the kicked-up portions 10 and 11 respectively from stock-width blanks 12 and 13 respectively, shown in Figs. 1 and 3. These strips 12 and 13 are steel strips of indefinite lengths and requisite gauge as it comes from the mill manufactured under any suitable formula but preferably under the formula S. A. E. 1025 possessing carbon in the amount of from .20%–.30%. Steel of this character in an untreated condition will allow for an elastic limit of at least 40,000 pounds per square inch as required by the automotive manufacturers. These strips of stock material are of sufficient width to permit of the sections 7 and 9 being blanked from the same, transversely thereof and nested as indicated in Figs. 1 and 3 to distribute what little scrap loss indicated by the portions marked 14 exists, over a greater number of blanks than can be achieved when full length rails are made from a single blank integral from end to end. As will be obvious, the maximum scrap results from the production of the first and last blanks cut from the strip of indefinite length and little or no scrap results from the production of the intermediate blanks or sections 7 and 9 so that the scrap can be distributed over a greater number of blanks. In former practice, only four or five full length rail blanks can be obtained from a single stock sheet, due to limitations of the stock itself and the impossibility of nesting the individual full length blanks to better advantage. Moreover, untreated stock material of the foregoing character ordinarily used in the construction of automobile chassis frames cannot be given a body finish and polish substantially equivalent to the exterior body finish of the ordinary automobile without the use of the expensive grinding and polishing equipment and the use of special fillers and lacquers, thereby running the cost of production of a chassis frame from the usual materials and the aforesaid equipment so high as to be practically prohibitive.

Figure 2:
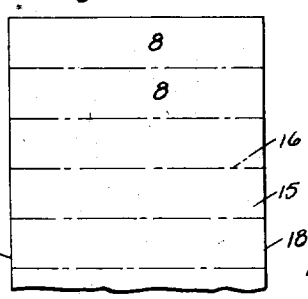
Fig. 2 is a similar view of a strip of pickled cold-rolled steel having a carbon content in the range of .10%–.25% as it comes from the mill, the dotted lines showing the manner of blanking out the intermediate sections of the side rails.

I have found that certain purposes of this invention can be accomplished by the use of special material for the intermediate sections 8 which will take on a body finish from the usual methods of finishing body plates for the body shell of the automobile and at the same time will possess the requisite elastic limit to anticipate manufacturers' specifications and requirements. While not desiring to be limited to any particular material for this purpose it has been found that the object of this invention can be admirably accomplished by the use of pickled, cold rolled, or rustless steels having carbon content somewhere close to the range of .10% up to possibly .25%. Such quality of material is represented in a strip of stock width designated by the numeral 15 in Fig. 2 which may be blanked to shape to form the individual blanks or sections 8 by cutting the strip along the dotted lines 16 transversely of the longitudinal dimensions of the strip. Preferably, however, these straight sections are produced from a roll of cold-rolled strip carried in stock and having a width equal to the width of the blank 8. In this manner, the blanks 8 can be produced by simply cutting the strip transversely of its length in lengths equal to the length of such blanks. The shape of the intermediate blanks is such that there is no waste by scrap or very little if requirements call for the blanks having slightly deflected longitudinal edges.

After the blanks 7, 8 and 9 have been blanked to any desired shape they may be placed in longitudinal alignment in the order named with their transverse end edges 17 and 18 arranged in abutting relationship to be united preferably by butt-welding to form the welded seams 19 which tend to increase the strength of the side rail against tension and compression as well as to have a tendency to minimize torsional stresses. The union of these three separate and independent blanks form substantially a one piece blank or strip of the requisite shape possessing the necessary characteristics hereinbefore mentioned. In case flash-welding is used the flash is removed from the exterior surface of the blank comprising the united sections 7, 8, and 9, after which it may be then cold formed into a channel section having throughout its entire length a web portion 20 and upper and lower inwardly extending horizontal flanges 21 and 22 respectively. If desired, each of the individual blanks 7, 8 and 9, prior to their being united into a single blank, may be formed into tubular or other appropriate cross section and subsequently united by butt-welding or otherwise connecting the meeting edges of the web and horizontal flanges of the individual sections along seams 19. However, for channel shaped rails it may be in some instances more economical to unite the individual blanks 7, 8 and 9 prior to their formation into a channel side rail. The exterior surface of the web of the section 8 may be subsequently provided with a body finish and polish equal to that of the exterior finish of an automobile body by the usual methods of finishing and polishing the body plates or shell.

With this construction, the usual dust shield or apron heretofore employed in automobile body construction above the running board 23, may be dispensed with, since the exposed exterior surfaces of the web of the intermediate section 8 of the side rail may be provided with a finish equivalent to that of the exterior surface of the automobile body 24. The running boards may be secured to the chassis frame in any suitable manner, although as here shown, they are attached to the side rails by means of step hangers or the angle bars 25. Portions 26 and 27, respectively of the front and rear mud guards cover the seams between the sections 7, 8 and 9 of the side rails thereby presenting a finished surface with no exposed rivets or other form of fastening means. By reason of the foregoing construction and arrangement of parts, two of the heretofore necessary adjuncts of the automobile body have been eliminated without sacrificing the elastic limits of the chassis frame, and the scrap incident to the manufacture of this invention has been reduced to the very minimum. While the invention has been illustrated in connection with the intermediate portions of the side rails forming dust shields, it is to be understood, that I do not limit the invention to this particular adjunct, other than in the appended claims, since parts of the frame, other than the intermediate section 8, may be provided with such body finish to be exposed exteriorly of the automobile body to take the place of other adjuncts or to present a more finished appearance for the portions of the frame which are exposed to view in the finished automobile.

Figure 8:
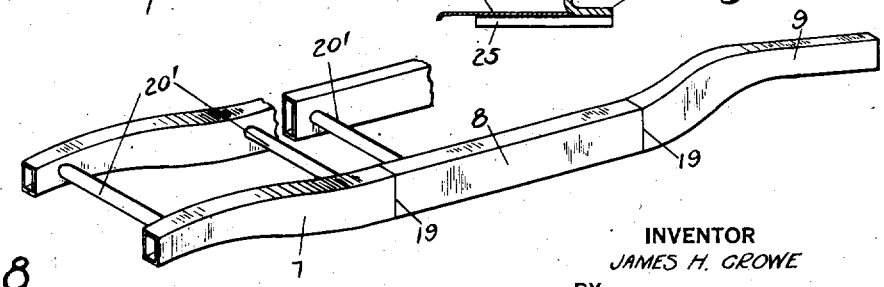
Fig. 8 is a fragmentary perspective view of a frame composed of box section side rails made in accordance with this invention.

Due to the fact that the side rails are composed of a plurality of sections, one or more of such sections can be made of different gauge material, i. e., the intermediate section 8 where the greater portion of the body loads are imposed may be of heavier gauge than the end sections 7 and 9, or the latter may be of thicker gauge than the intermediate section. Likewise, these component sections of the rails may be of different metallurgical analysis and of various cross sectional shapes than those illustrated. Also, the component parts of each side rail may be of different cross sectional shape. For instance the intermediate section 8 may be of tubular or box cross-section while the end sections may be channel shape or vice versa or all of the sections may be of box or tubular section. As stated previously, the component sections or any of them may be constructed from stainless or rustless steel. Furthermore, the frame including both side rails may be manufactured in three separate assemblies, i. e., as shown in Fig. 8, the complementary sections 7, 8, or 9 of two side rails may be connected together by suitable cross members 20' as a unit after which the various component sections of both rails can be united to form the complete chassis frame. By this alternative construction, the intermediate sections 8 of two side rails joined by cross braces 20' or the like to form a unit, may be carried in stock for subsequent assembly with complementary pairs of sections 7 and 9 of various shapes also joined by cross braces 20' or the like. In this manner, varying shapes of side rails with different degrees of kick-ups and different metallurgical analyses can be built up from a more or less stock or standardized intermediate unit.

I claim:

1. An automobile chassis frame including side rails having portions thereof composed of metal possessing metallurgical structure capable of taking a body finish from the usual method for finishing body plates and possessing the requisite elastic limits to be serviceable as a frame element, the remaining portions of the chassis rails being of different metallurgical structure.

2. An automobile chassis frame including side rails each comprising a longitudinal member composed of component parts, said parts possessing different metallurgical structure and united to form an integral whole, some of said parts being capable of taking a body finish from the usual method for finishing body plates.

3. An automobile chassis frame including side rails each composed of a longitudinal member, comprising component blanks, one of which is pickled cold rolled stainless steel and others of steel of higher carbon content united to the others by butt-welding the meeting edges of the blanks to form an integral whole.

4. An automobile chassis frame including side rails having kickups at the ends thereof, said kicked-up portions being formed from separate blanked-to-shape sections, the intermediate portion of each rail being a separate section of cold rolled steel and the other sections being of steel of a higher carbon content, all of said sections of each rail being arranged in alignment and united by butt-welding the meeting edges of the sections together to form an integral whole.

5. The combination with an automobile body possessing the usual body finish; of a chassis frame having the outer surface of the web of a U-shaped channel portion thereof possessing a body finish substantially equal to that of the body and exposed exteriorly thereof to form a part of the exterior of the body, the remaining portions of the chassis frame being of different metallurgical structure.

6. An automobile chassis frame including a side rail composed of a pair of separate blanked-to-shape end strips having longitudinally curved longitudinal edges, and an intermediate substantially straight edged strip of cold-rolled steel having its ends corresponding in width to the ends of the end strips and having a lower carbon content than the end strips butt-welded at its transverse edges to the corresponding transverse edges of the end strips to form a unitary side rail blank, said blank being formed into appropriate section to produce a rail having a kick-up at each end thereof.

7. The method of making automobile chassis side rails consisting of cutting stock-strips transversely of their lengths to provide end sections having their longitudinal edges curved, cutting another stock-strip transversely of its length to provide intermediate sections, arranging a pair of end sections in alignment with an intermediate section with their end edges in abutment, butt-welding said end edges together to provide a continuous blank with contoured longitudinal edges, and then forming such blank into appropriate section to provide a side rail having kick-ups at its ends.

8. The combination with an automobile body having running boards; of a chassis frame having side rails, each composed of component channel sections welded end to end with their flanges in longitudinal alignment, the intermediate sections only of the rail being disposed in back of the running boards and having a metallurgical structure capable of receiving a body finish substantially equal to that of the exterior of the body, and fenders secured to the body and arranged to cover the welded joints between the chassis sections.

9. The combination with an automobile body having running boards, of a chassis frame having side rails each composed of component channel sections welded end to end with their flanges in longitudinal alignment, the intermediate sections only of the rail being disposed in back of the running boards and having a metallurgical structure capable of receiving a body finish substantially equal to that of the exterior of the body, horizontal hangers secured to the lower flange of the intermediate sections, and running boards supported upon said hangers and having their inner longitudinal edges abutting the finished webs of the intermediate sections.

10. The method of making automobile chassis side rails consisting of cutting sheets transversely of their lengths to provide end sections having their longitudinal edges curved, cutting another sheet along substantially straight parallel lines, transversely of its length to provide intermediate sections possessing ends having width corresponding to the width of the end sections, arranging a pair of end sections in alignment with an intermediate section with their transverse edges in abutment and their longitudinal edges in alignment, welding said transverse edges together to provide a substantially integral blank with contoured longitudinal edges, and then forming said blank into channel section to provide a side rail having kick-ups at its ends.

11. The method of making automobile side rails consisting of cutting stock-strips transversely of their lengths to provide end sections, cutting another stock-strip transversely of its length to provide intermediate sections, forming said sections into appropriate cross section, arranging a pair of formed end sections in alignment with a formed intermediate section with their end edges adjacent each other, and then securing said end edges together to provide a continuous side rail from said respective sections.

12. The method of making automobile side rails consisting of cutting stock-strips transversely of their lengths to provide ends sections, cutting another stock-strip transversely of its length to provide intermediate sections, forming said sections into appropriate cross section, arranging a pair of formed end sections in alignment with a formed intermediate section with their end edges in abutment, and butt welding said end edges together to provide a continuous side rail.

13. The method of making automobile side rails consisting of cutting a stock-strip to provide end sections having their longitudinal edges curved, cutting another stock-strip along parallel lines transversely of its length to provide intermediate sections possessing ends having widths corresponding to the widths of the end sections, forming said sections into appropriate cross section, arranging a pair of formed end sections in alignment with a formed intermediate section with their end edges adjacent each other, and then securing said end edges together to provide a continuous side rail.

14. The method of making automobile side rails consisting of cutting stock-strips transversely of their lengths to provide end sections having their longitudinal edges curved, cutting another stock-strip transversely of its length to provide intermediate sections, arranging a pair of end sections in alignment with an intermediate section with their end edges in abutment, butt-welding said end edges together to provide a continuous blank with contoured longitudinal edges, and then forming such blanks into appropriate cross section to provide a side rail having kick-ups at its ends.

15. The method of making automobile side rails consisting of cutting stock strips to provide end sections having their longitudinal edges curved transversely in the direction of their length to provide kickup portions, cutting a separate substantially straight edged stock strip to provide intermediate sections possessing ends having widths corresponding to the widths of the ends of said end sections, forming said sections into appropriate cross section, arranging a pair of formed end sections in alignment with a formed intermediate section with their end edges adjacent each other, and then securing said end edges together to provide a continuous side rail from said respective sections.

16. The method of making automobile frame side rails consisting of cutting a sheet transversely of its length to provide sections having their longitudinal edges curved laterally to provide kickup portions, cutting another sheet to provide other component sections, forming said sections into appropriate cross section, arranging a pair of said formed sections in alignment with their end edges abutting, and welding said end edges together to provide a side rail of component sections.

17. The method of making automobile frame side rails consisting of cutting stock to provide a rail end section having its longitudinal edges curved transversely in the direction of its length to provide a kickup portion; cutting another sheet of stock to provide other component sections, forming said sections into tubular or box section; arranging a pair of said formed sections with their ends in alignment, and welding said formed sections together end to end to provide a side rail of tubular or box section from end to end.

18. The method of making automobile side rails consisting of cutting stock to provide end sections having their longitudinal edges curved transversely in the direction of their lengths to provide kickup portions, cutting a separate substantially straight edged stock strip transversely of its length along lines substantially parallel to the original substantially straight edge of the stock to provide intermediate sections possessing ends having widths corresponding to the width of the ends of the end sections, and securing said three sections together to form a rail having a portion thereof offset vertically from the intermediate section and in the plane thereof.

19. The method of manufacturing an automobile side rail consisting of providing a plurality of lengths of tubular stock to be united end to end into a tubular side rail, the ends of said lengths to be joined being of identical cross sectional area, certain of said lengths being formed from flat blanks cut substantially transversely of stock strips and having their longitudinal edges curved to provide, when formed, tubular lengths with kickups, arranging the component tubular lengths with their adjacent ends abutting, and flash welding the plurality of lengths of tubular stock end to end to provide a side rail continuously tubular from end to end.

JAMES H. CROWE.